W. P. STEELE, J. PLAYER & C. J. MELLIN.
SPARK ARRESTING APPLIANCE FOR LIGNITE BURNING LOCOMOTIVES.
APPLICATION FILED JAN. 8, 1909.
934,767.
Patented Sept. 21, 1909.
5 SHEETS—SHEET 4.
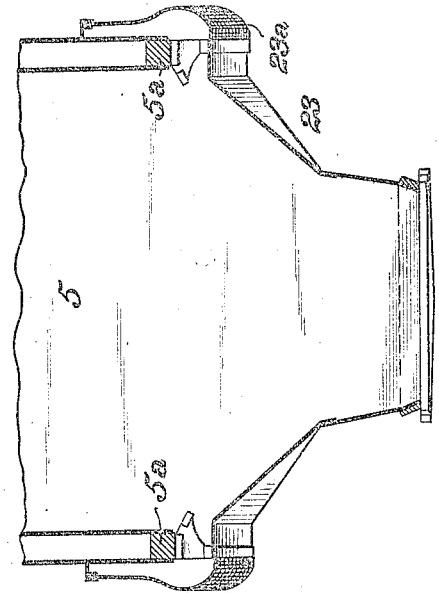
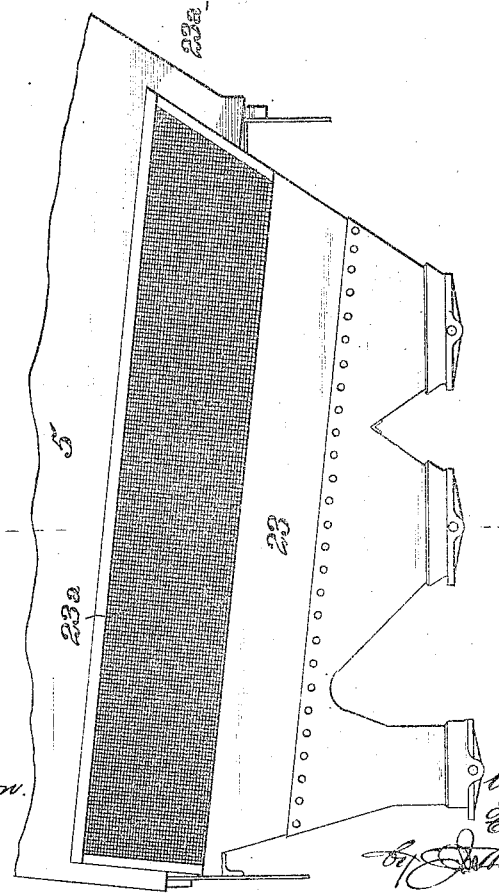

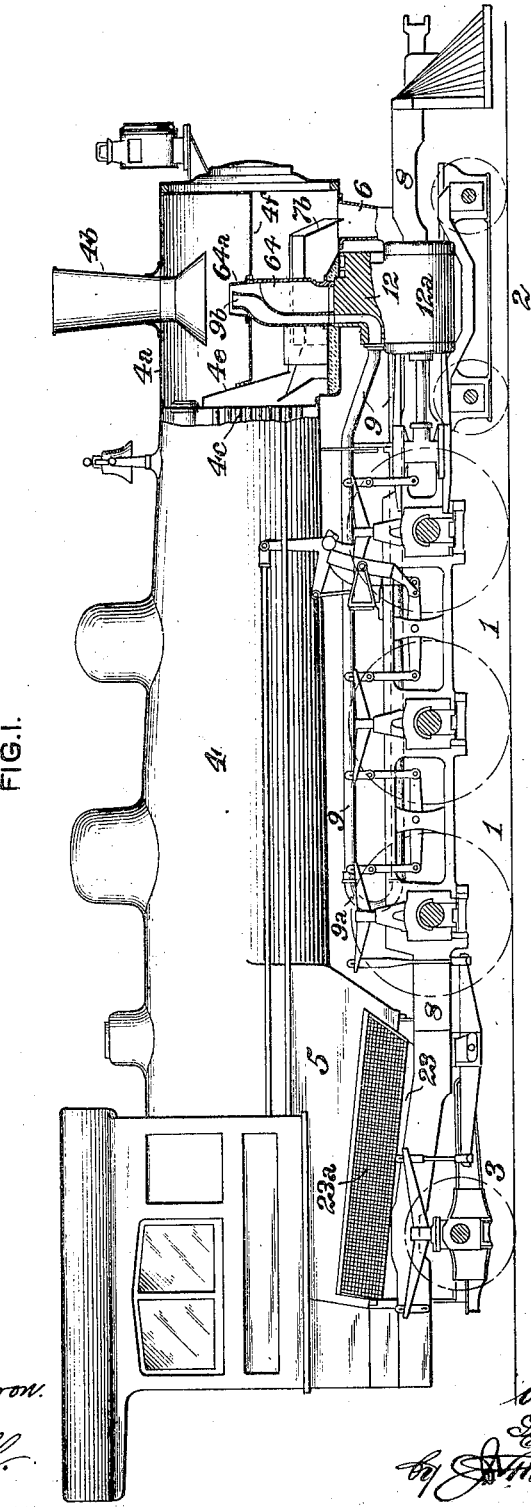

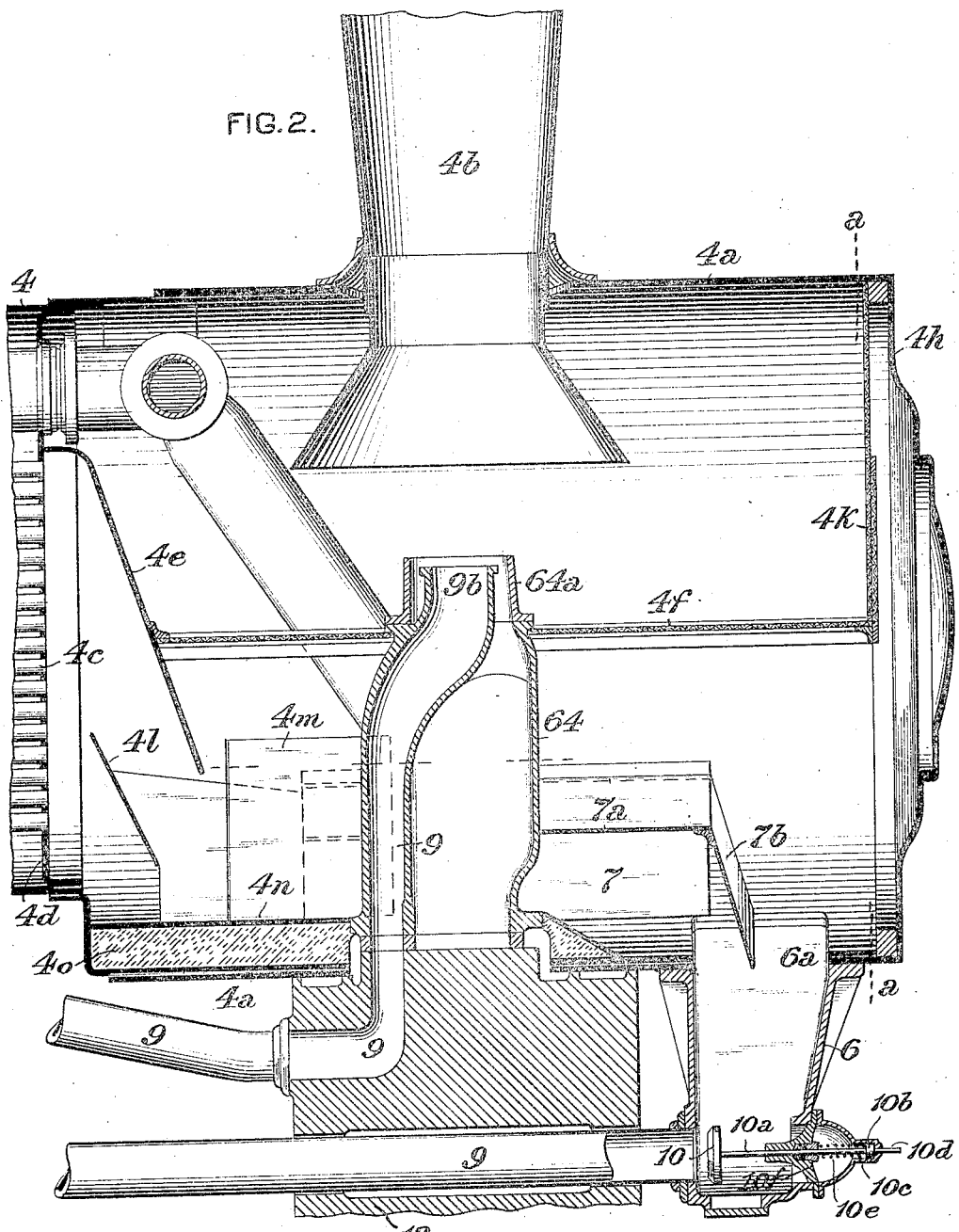

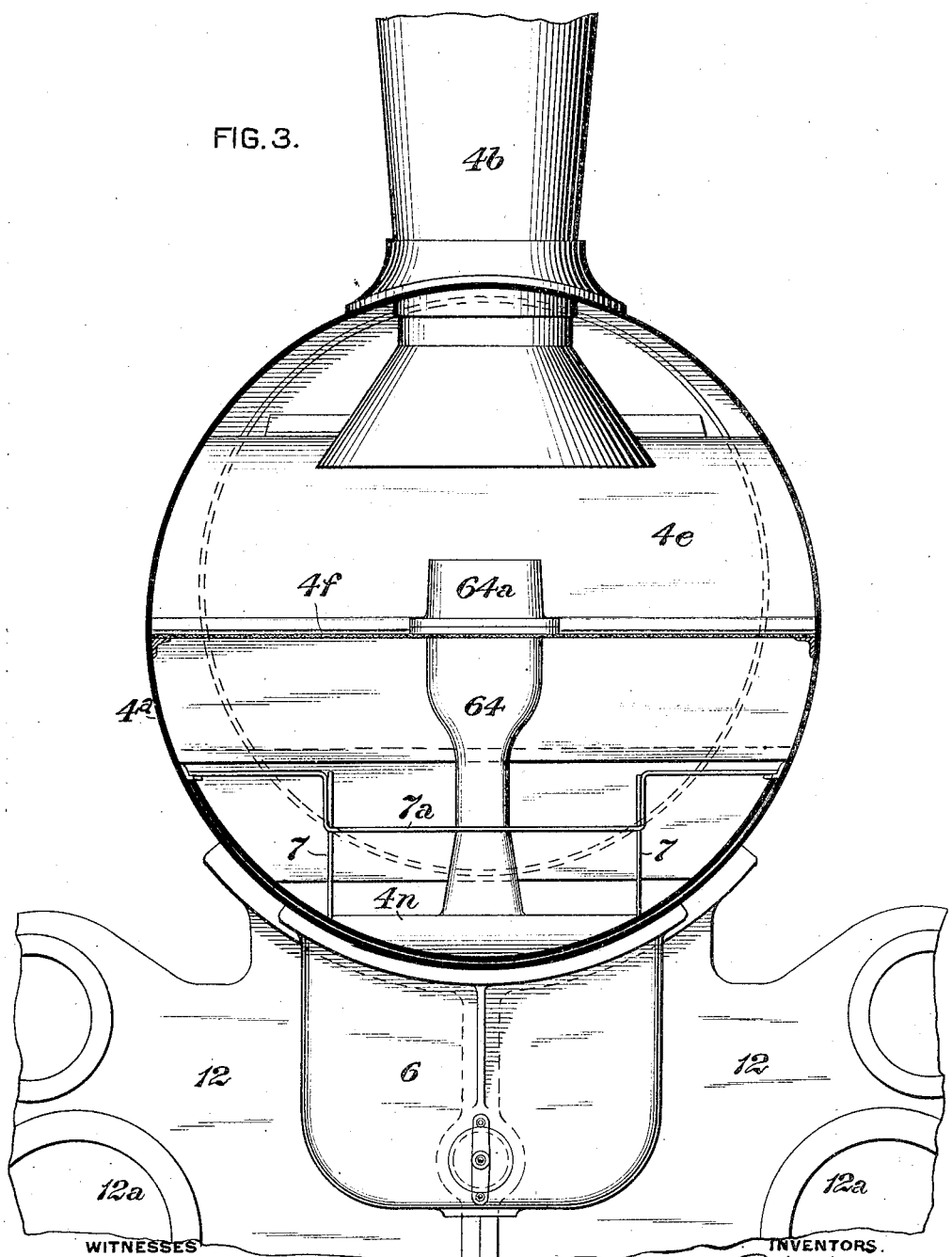

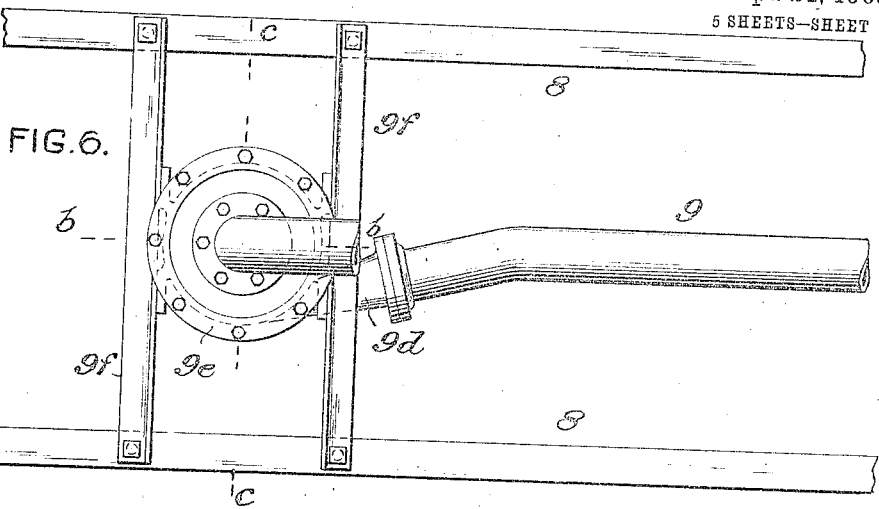
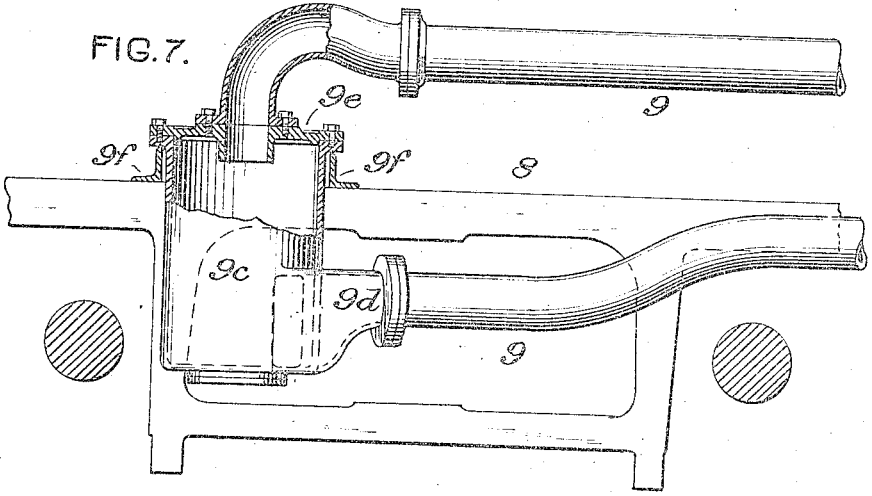
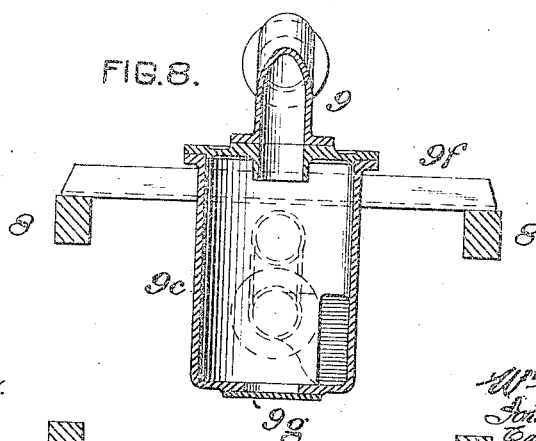

UNITED STATES PATENT OFFICE.

WILLIAM P. STEELE, OF PALISADE, NEW JERSEY, AND JOHN PLAYER AND CARL J. MELLIN, OF SCHENECTADY, NEW YORK, ASSIGNORS TO AMERICAN LOCOMOTIVE COMPANY, OF NEW YORK, N. Y., A CORPORATION OF NEW YORK.

SPARK-ARRESTING APPLIANCE FOR LIGNITE-BURNING LOCOMOTIVES.

934,767.

Specification of Letters Patent. Patented Sept. 21, 1909.

Application filed January 8, 1909. Serial No. 471,262.

*To all whom it may concern:*

Be it known that we, WILLIAM P. STEELE, of Palisade, in the county of Bergen and State of New Jersey, and JOHN PLAYER and CARL J. MELLIN, of Schenectady, in the county of Schenectady and State of New York, have jointly invented a certain new and useful Improvement in Spark-Arresting Appliances for Lignite-Burning Locomotives, of which improvement the following is a specification.

The object of our invention is to provide means, of ready and inexpensive adaptability in locomotive boilers of the standard type, whereby lignite and other fuels of such character as that considerable quantities of light sparks or cinders are evolved from them in their combustion under an exhaust blast in locomotive fireboxes, may be burned therein without the emission of ignited sparks or cinders from the stack, and without impairment of the free steaming qualities of the locomotive boiler.

The leading and characteristic feature of our invention consists in a novel construction and combination of members whereby the solid products of combustion, i. e., the sparks and cinders, lifted, by the action of the exhaust blast, from the body of fuel in combustion on the grate, are separated from the gases of combustion upon their exit from the front ends of the boiler tubes, the gases being permitted to pass therefrom directly to and out of the stack and the cinders being diverted into a conduit or passage of considerable length, having a discharge terminal located within the exhaust nozzle, and being, in their traverse through said conduit, so far reduced in temperature as to be incapable of being ignited when finally discharged, through said nozzle and the stack, into the atmosphere.

The improvement claimed, comprehending the essential elements of a construction as above specified, and sundry structural details relating thereto, is hereinafter fully set forth.

In the accompanying drawings: Figure 1, is a side view, partly in section, of a locomotive, illustrating an application of our invention; Fig. 2, a vertical central section, on an enlarged scale, through the smoke box thereof; Fig. 2ª, a horizontal section through the exhaust pipe and deflecting guard; Fig. 3, a transverse section through the smoke box, on the line a a of Fig. 2; Fig. 4, a side view, in elevation, of the ash pan; Fig. 5, a vertical transverse section through the same; Fig. 6, a plan view, on an enlarged scale, of the rear portion of the cooling conduit, showing the application of a cinder pot thereto; Fig. 7, a side view, partly in section, on the line b b of Fig. 6, of the same; and, Fig. 8, a vertical section, on the line c c of Fig. 6, through the cinder pot.

Our invention is herein exemplified as applied on a locomotive of the standard "Pacific" or 4-6-0 type, which is supported on six driving wheels, 1, a four wheel leading truck, 2, and a trailing truck, 3. The boiler, 4, is of the ordinary fire tube type, having a plurality of fire tubes, 4ᵉ, extending from a firebox, 5, at its rear end, to a smoke box, 4ª, at its front end, which is provided with an open stack, 4ᵇ, and fixed to cylinder saddles, 12, secured to the side frame members, 8, of the locomotive. It will, however, be obvious to those skilled in the art, that our invention is equally applicable to any of the other standard types of locomotives known and used in present practice.

In the practice of our invention, an inclined deflecting plate or diaphragm, 4ᶜ, is located as in ordinary practice, forward of the front flue sheet, 1ᵈ, and projects downwardly and forwardly from a level above the top row of tubes, across the smoke box, 1ª, which, in order to provide sufficient space for appliances included therein as hereinafter described, extends below the waist of the boiler, 4, being for that purpose, made either of greater diameter than, and connected eccentrically to, the front ring of the waist, or, equivalently, being made of oblong transverse section, with a greater vertical diameter than that of said front ring. An exhaust pipe, 64, of any suitable known form, is fixed to the cylinder saddles 12, and communicates, in the usual manner, with the exhaust passages of the cylinders, 12ª, which are formed therein, the exhaust pipe being provided, at its top, with an exhaust nozzle, 64ª. A suitable spark arrester surrounds the exhaust pipe, the form shown consisting of a sheet of netting or perforated plate, $4^f$, which extends from the deflecting plate, $4^e$, to or near the front, $4^h$, of the smoke box, and is connected, at its forward end, to a sheet, $4^k$, which extends to the top of the smoke box, and which may be of plain or perforated plate or of wire netting, as preferred. A supplemental deflecting plate, $4^l$, is preferably extended across the smoke box, in rear of the deflecting plate $4^e$, said plate being located in front of several of the lower rows of boiler tubes, $4^c$; presenting open spaces at its top and bottom; and extending from a level above the bottom of the deflecting plate, $4^e$, to a level below that of the lowest row of tubes. A deflecting guard, $4^m$, composed of two metal plates, inclined inwardly and rearwardly and connected at their rear ends, is secured to the rear of the exhaust pipe, $64$, the function of said guard being to protect the exhaust pipe from the direct impact of the cinders passing from below the deflecting plates, $4^e$ and $4^l$, as well as to deflect the current of cinders to the opposite sides of the exhaust pipe. The bottom of the smoke box is protected by a floor plate, $4^n$, extending from the back of the smoke box to the front of the exhaust pipe, and downwardly inclined at its front end, and the space between the floor plate and the bottom of the smoke box is filled with a lining of refractory material, $4^o$.

The smoke box is extended for a short distance in advance of the cylinder saddles, $12$, and an open topped cinder hopper, $6$, which forms a receptacle for the sparks and cinders that are downwardly deflected by the deflecting plate, $4^e$, is connected to the bottom of the smoke box, in front of the cylinder saddles and around an opening, $6^a$, formed transversely in the bottom of the smoke box and of a length equal to about one-half the diameter thereof, or such as may be sufficient to provide an ample area for the delivery of cinders into the hopper, $6$. Vertical dividing plates, $7$, are fixed to the bottom of the smoke box, on each side of the exhaust pipe, said plates extending from a plane a short distance forward of the flue sheet $4^c$ to or near the cinder delivery opening, $6^a$, the function of said plates being to separate or keep apart the currents of cinders which strike the curved sides of the smoke box on opposite sides of the exhaust nozzle, and which would otherwise be deflected from each side toward the central plane thereof, and would there form whirling currents which would tend to lift and carry them directly to the spark arrester. A horizontal upper separator plate, $7^a$, extends across the space between the dividing plates, $7$, below the tops thereof, and is continued vertically to their tops and thence horizontally to the sides of the smoke box, as clearly shown in Fig. 3. The spaces below said separator plate and between it and the floor plate, $4^n$, form channels through which the cinders which are thrown downwardly toward the floor plate, $4^n$, and separated from the gases by their velocity in their discharge from the boiler tubes, pass toward the cinder delivery opening, $6^a$, into which they are diverted by an inclined cinder hopper deflector, $7^b$, extending across the smoke box above said cinder delivery opening.

The cinders which are deposited in the cinder hopper, $6$, are discharged therefrom by the suction induced by the exhaust blast, by which they are drawn into and through a cinder cooling conduit or passage, which is, in this instance, shown as in the form of a pipe, $9$, communicating, at its forward end, with the cinder hopper, near the bottom thereof, and thence leading, first rearwardly as far as practicable, (in the instance shown nearly to the rear driving axle), and then, through the intermediation of a return bend, $9^a$, or other suitable connection, forwardly and upwardly to a discharge opening or nozzle, $9^b$, located within the exhaust nozzle, $64^a$. As shown in Fig. 3, the forward portion of the rearwardly extending length of the cooling passage passes through a horizontal opening cored in one of the cylinder saddles, $12$, and the forward portion of the forwardly extending length of said passage is continued to the discharge nozzle, $9^b$, through a communicating elbow shaped passage in the saddle and a vertical pipe cast integral with the exhaust pipe, $64$, the cooling passage being continuous, although comprising different sections, from the cinder hopper, $6$, to the discharge nozzle, $9^b$, within the exhaust nozzle, $64^a$. It will be seen that by this location of the nozzles, $9^b$ and $64^a$, the suction of the exhaust blast will draw the cinders from the hopper, $6$, through the cooling passage, $9$, and eject them, mingled with the exhaust steam, through the stack, $4^b$. In and by their traverse through the cooling passage, which, as shown, is of considerable length, and their admixture with the exhaust steam, the cinders will be reduced in temperature and extinguished when they are discharged from the stack, and, consequently, risk of fire damage to property adjoining the right of way, which has heretofore always obtained to a substantial extent, will be eliminated.

Figs. 6 to 8 inclusive illustrate a modification of structural detail in which the rearwardly and forwardly extending lengths of the cinder cooling passage, $9$, are connected through the intermediation of a cinder pot, $9^c$, instead of by a return bend, $9^a$, as above described, the rearwardly extending length being connected to a nozzle, $9^d$, on the lower portion of the cinder pot, and the forwardly extending portion connected to a cover plate $9^x$, closing the top thereof. The cinder pot is supported on transverse braces, $9^f$, secured to the engine frame members, 8, and may be either of cylindrical form as shown, or as an inverted cone, the latter form presenting the advantage of being more readily cleared of cinders, if any should accumulate therein. An opening in the cinder pot, closed by a removable plate, $9^g$, enables any cinders that may be deposited in the cinder pot to be removed therefrom.

It has been found in practice that when the fire door is opened, a greater quantity of sparks or cinders is lifted from the fire and carried through the tubes than when the door is closed, and it is therefore desirable to prevent too great a delivery of cinders through the cooling passage, 9, while the door is open. To this end, a valve, 10, seating at the end of the cooling passage which opens into the cinder hopper, 6, is provided, said valve being normally open, and being closed only when the fire door is open. The valve, 10, is fixed upon a stem, $10^a$, which carries a piston, $10^b$, working in a fluid pressure cylinder, $10^c$, fixed to the cinder hopper, 6, to which cylinder, air or steam is admitted through a pipe, $10^d$, and a spring, $10^e$, bearing on said piston and on a guide, $10^f$, secured to the cinder hopper, holds the valve, 10, open or unseated when the piston is not exposed to pressure.

In the use of lignite fuel, a large amount of light ash sifts through the grate into the ash pan, and in order to prevent this ash from being blown out of the pan by the wind, and at the same time admit the requisite quantity of air, for draft, it is necessary to cover the openings between the firebox, ash pan, 23, and the bottom of the firebox, 5, with netting of extremely fine mesh. As the ash pan cannot be lowered by reason of its relation to the wheels and frame below it, a sufficient area for air admission cannot be obtained with fine mesh netting, when applied directly and of superficial area equal only to that of the air openings below the firebox. In order to insure draft which will be ample for free steaming in the use of the smoke box members above described, the side spaces between the mud ring, $5^a$, of the firebox and the ash pan, 23, are covered by screens, $23^a$, of netting, of sufficiently fine mesh to prevent the escape of ashes, said screens being outwardly curved or bent at their lower portions and extended to a level above the bottom of the mud ring, their tops being connected to the sides of the firebox by interposed angles, thereby presenting a largely increased area for air admission over that which would be obtainable with the ordinary flat sheets of netting, which extend only over the openings between the mud ring and the body of the ash pan.

Various structural modifications of the specific construction herein set forth may be made by those skilled in the art, without departure from the spirit and operative principle of our invention as exemplified herein in the form in which it has been applied and is now in satisfactory operation in practical railroad service. Thus, for example, the cinder hopper, which is herein shown as a separate casting connected to the smoke box, may, if preferred, be cast integral with a cylinder saddle, or with the bed plate in cases where a bed plate and separate cylinders are used. The discharge nozzle of the cinder cooling passage may also be applied in connection with any of the various known forms of annular exhaust nozzles, and the location and inclination of the several deflecting plates and partition plates of the smoke box may be varied in the discretion of the constructor, and in accordance with the characteristics of the kind and grade of fuel used, and the conditions of service under which the locomotive is operated.

We claim as our invention and desire to secure by Letters Patent:

1. The combination, with a locomotive boiler, of means, within the smoke box of the boiler, for separating the solid from the gaseous products of combustion after their escape from the tubes of the boiler, and means, in communication with the smoke stack of the boiler, for effecting a prolonged traverse, exterior to the smoke box, of the separated solid products, and thereby cooling them prior to their subsequent ejection from the stack by the action of the exhaust steam jet.

2. The combination, with a locomotive boiler, of means, within the smoke box of the boiler, for separating the solid from the gaseous products of combustion after their escape from the tubes of the boiler, and means, in communication with the smoke stack of the boiler, for effecting a prolonged traverse, exterior to the smoke box, of the separated solid products prior to their ejection from the stack, by the action of the exhaust steam jet, and a coincident cooling of said products during said traverse.

3. The combination, with a locomotive boiler, of means, within the smoke box of the boiler, for separating the solid from the gaseous products of combustion after their escape from the tubes of the boiler, a receptacle for the separated solid products, and means, in communication with the smoke stack of the boiler, for effecting a prolonged traverse of the separated solid products, exterior to the smoke box, between said receptacle to the stack, by the action of the exhaust steam jet, and a coincident cooling of said products during said traverse.

4. The combination, with a locomotive boiler, of means, within the smoke box of the boiler, for separating the solid from the gaseous products of combustion after their escape from the tubes of the boiler, a receptacle for the separated solid products, and means, in communication with the smoke stack of the boiler, for effecting a prolonged traverse of the separated products, exterior to the smoke box, between said receptacle and the stack, by the action of the exhaust steam jet, and a coincident cooling of said products during said traverse.

5. The combination, with a locomotive boiler, of means for separating the solid and gaseous products of combustion escaping from the tubes of the boiler, a cooling conduit or passage receiving the separated solid products, a discharge nozzle in the smoke box of the boiler, in which said conduit terminates, and a cylinder exhaust pipe inclosing said discharge nozzle.

6. The combination, with a locomotive boiler, of means for separating the solid and gaseous products of combustion escaping from the tubes of the boiler, a receptacle for the separated solid products, a cooling conduit or passage leading from said receptacle, a discharge nozzle in the smoke box of the boiler, in which said conduit terminates, and a cylinder exhaust pipe inclosing said discharge nozzle.

7. The combination, with a locomotive boiler, of means for separating the solid and gaseous products of combustion escaping from the tubes of the boiler, means for dividing the separated solid products into separate currents, a receptacle for the several currents of separated solid products, a cooling conduit or passage leading from said receptacle, a discharge nozzle in the smoke box of the boiler, in which said conduit terminates, and a cylinder exhaust pipe inclosing said discharge nozzle.

8. The combination, with a locomotive boiler provided with means for separating the solid and gaseous products of combustion escaping from the boiler tubes and subsequently cooling and extinguishing the separated solid products by the action of the exhaust steam jet, of an ash pan provided with lateral openings, and extended outwardly protruding screens of netting, located over said openings, for preventing the escape of ashes and increasing the area of air admission into the ash pan to compensate for the increased resistance to draft induced by the spark extinguishing means.

9. The combination, with a locomotive boiler, of means for separating the solid and gaseous products of combustion, a cooling conduit or passage receiving the separated solid products, a discharge nozzle in the smoke box of the boiler, in which said conduit terminates, a receptacle interposed between separate sections of said cooling passage, and a cylinder exhaust pipe inclosing the discharge nozzle of the cooling passage.

10. The combination, with a locomotive boiler, of means for separating the solid and gaseous products of combustion escaping from the tubes of the boiler, a receptacle for the separated solid products, a cooling conduit or passage leading from said receptacle, a discharge nozzle in the smoke box of the boiler, in which said conduit terminates, a valve controlling communication between said receptacle and said passage, and a cylinder exhaust pipe inclosing the discharge nozzle of said passage.

11. The combination, with a locomotive boiler, of means for separating the solid and gaseous products of combustion escaping from the tubes of the boiler, a receptacle for the separated solid products, a cooling conduit or passage leading from said receptacle, a discharge nozzle in the smoke box of the boiler, in which said conduit terminates, a valve controlling communication between said receptacle and said passage, a fluid pressure cylinder having a piston connected to and adapted to operate said valve, and a cylinder exhaust pipe inclosing the discharge nozzle of said passage.

12. The combination, with a locomotive boiler having a delivery opening in the bottom of its smoke box, of an exhaust pipe, a deflecting plate extending forwardly and downwardly from above the top row of tubes of the boiler, a spark arrester surrounding the exhaust pipe, an inwardly and rearwardly tapering deflecting guard adjoining the exhaust pipe at the rear thereof, a cinder hopper communicating with the delivery opening of the smoke box, and a transverse separator plate extending across the smoke box between the deflecting plate and the delivery opening.

13. The combination, with a locomotive boiler having a delivery opening in the bottom of its smoke box, of an exhaust pipe, a deflecting plate extending forwardly and downwardly from above the top row of tubes of the boiler, a spark arrester surrounding the exhaust pipe, a supplemental deflecting plate extending across the smoke box below and in rear of the first named deflecting plate and presenting open spaces at its top and bottom, a cinder hopper communicating with the delivery opening of the smoke box, and a transverse separator plate extending across the smoke box between the deflecting plate and the delivery opening.

14. The combination, with a locomotive boiler having a smoke box which is integrally extended below the waist of the boiler, a deflecting plate extending forwardly and downwardly from above the top row of tubes, an exhaust pipe, a spark arrester surrounding the exhaust pipe, a transverse separator plate extending across the smoke box below the spark arrester, and a floor extending across the downward extension of the smoke box.

15. The combination, with a locomotive boiler having a smoke box which is integrally extended below the waist of the boiler and is provided with a delivery opening in its bottom, of a floor extending across the downward extension of the smoke box, a deflecting plate, extending forwardly and downwardly from above the top row of tubes, an exhaust pipe, a spark arrester surrounding the exhaust pipe, a cinder hopper communicating with the delivery opening of the smoke box, and a transverse separator plate extending across the smoke box, above the floor and between the deflecting plate and the delivery opening.

16. The combination, with a locomotive boiler having a delivery opening in the bottom of its smoke box, of a deflecting plate extending forwardly and downwardly from above the top row of boiler tubes, an exhaust pipe, a spark arrester surrounding the exhaust pipe, a cinder hopper communicating with the delivery opening of the smoke box, vertical dividing plates projecting upwardly from the bottom of the smoke box between the deflecting plate and the delivery opening, and a transverse separator plate extending between the dividing plates and thence to the shell of the smoke box.

17. The combination, with a locomotive boiler having a delivery opening in the bottom of its smoke box, of a deflecting plate extending forwardly and downwardly from above the top row of boiler tubes, an exhaust pipe, a spark arrester surrounding the exhaust pipe, a cinder hopper communicating with the delivery opening of the smoke box, a transverse separator plate extending across the smoke box between the deflecting plate and the delivery opening, and a cinder hopper deflector extending downwardly in front of the transverse separator plate above the delivery opening.

WILLIAM P. STEELE.
JOHN PLAYER.
CARL J. MELLIN.

Witnesses as to W. P. Steele:
  H. P. Conley,
  Katharine Baer.

Witnesses as to John Player:
  G. M. Cooper,
  D. C. Wenzell.

Witnesses as to Carl J. Mellin:
  W. F. Drysdale,
  M. A. Gilmore.